US011568155B2

(12) United States Patent
Dvorkovich et al.

(10) Patent No.: US 11,568,155 B2
(45) Date of Patent: Jan. 31, 2023

(54) METHOD AND SYSTEM OF TRANSLATING A SOURCE PHRASE IN A FIRST LANGUAGE INTO A TARGET PHRASE IN A SECOND LANGUAGE

(71) Applicant: YANDEX EUROPE AG, Lucerne (CH)

(72) Inventors: Anton Aleksandrovich Dvorkovich, Moscow (RU); Ekaterina Vladimirovna Enikeeva, Saint-Petersbourg (RU)

(73) Assignee: YANDEX EUROPE AG, Lucerne (CH)

( * ) Notice: Subject to any disclaimer, the term of this patent is extended or adjusted under 35 U.S.C. 154(b) by 332 days.

(21) Appl. No.: 16/884,920

(22) Filed: May 27, 2020

(65) Prior Publication Data
US 2020/0401771 A1    Dec. 24, 2020

(30) Foreign Application Priority Data

Jun. 19, 2019 (RU) .............................. 2019119101

(51) Int. Cl.
*G06F 40/58* (2020.01)
*G06F 40/47* (2020.01)
*G06F 40/30* (2020.01)

(52) U.S. Cl.
CPC .............. *G06F 40/58* (2020.01); *G06F 40/30* (2020.01); *G06F 40/47* (2020.01)

(58) Field of Classification Search
CPC .......... G06F 40/47; G06F 40/58; G06F 40/30; G06F 40/49; G06F 40/45; G06F 40/51; G06F 40/242; G10L 13/02
See application file for complete search history.

(56) References Cited

U.S. PATENT DOCUMENTS 6,154,720 A * 11/2000 Onishi .................... G06F 40/30
704/2
6,473,729 B1 * 10/2002 Gastaldo ................ G06F 40/45
704/7
(Continued)

FOREIGN PATENT DOCUMENTS

CN    102236643 A    11/2011
CN    104133561 A    11/2014
(Continued)

OTHER PUBLICATIONS

"Drawing Basics" Oct. 15, 2016, posted at support.omnigroup.com, [site visited Nov. 9, 2020]. https://support.omnigroup .com/documentation/omnigraffle/mac/7 .Olen/drawing-basics (Year: 2016).
(Continued)

*Primary Examiner* — Michael N Opsasnick
(74) *Attorney, Agent, or Firm* — BCF LLP

(57) ABSTRACT

There is disclosed a method and system for translating a source phrase in a first language into a second language. The method being executable by a device configured to access an index comprising a set of source sentences in the first language, and a set of target sentences in the second language, each of the target sentence corresponding to a translation of a given source sentence. The method comprises: acquiring the source phrase; generating by a translation algorithm, one or more target phrases, each of the one or more target phrases having a different semantic meaning within the second language; retrieving, from the index, a respective target sentence for each of the one or more target phrases, the respective target sentence comprising one of the one or more target phrases; and selecting each of the one or more target phrase and the respective target sentences for display.

17 Claims, 9 Drawing Sheets

(56) References Cited

U.S. PATENT DOCUMENTS

| | | | |
|---|---|---|---|
| 6,735,559 B1 | 5/2004 | Takazawa | |
| D523,442 S | 6/2006 | Hiramatsu | |
| D590,408 S | 4/2009 | Evans et al. | |
| D605,657 S | 12/2009 | Danton | |
| D656,515 S | 3/2012 | Bechtold et al. | |
| 8,386,234 B2 | 2/2013 | Uchimoto et al. | |
| D695,752 S | 12/2013 | Edwards et al. | |
| D720,765 S | 1/2015 | Xie et al. | |
| D732,054 S | 6/2015 | Yoneda et al. | |
| D751,110 S | 3/2016 | Chetan et al. | |
| D774,088 S | 12/2016 | Park et al. | |
| 9,552,355 B2 | 1/2017 | Dymetman et al. | |
| D803,872 S | 11/2017 | Cole | |
| D824,413 S | 7/2018 | Hurst et al. | |
| 10,061,769 B2 | 8/2018 | Fujiwara | |
| D842,874 S | 3/2019 | Tashiro et al. | |
| 10,303,761 B2 | 5/2019 | Yamauchi et al. | |
| D850,462 S | 6/2019 | Hazel et al. | |
| D881,919 S | 4/2020 | Elgena et al. | |
| 10,761,691 B2 | 9/2020 | Anzures et al. | |
| D904,427 S | 12/2020 | Rothwell | |
| 2004/0032420 A1 | 2/2004 | Allen et al. | |
| 2005/0267734 A1* | 12/2005 | Masuyama | G06F 40/45 704/2 |
| 2007/0129935 A1* | 6/2007 | Uchimoto | G06F 40/47 704/9 |
| 2007/0226617 A1 | 9/2007 | Traub et al. | |
| 2009/0132235 A1* | 5/2009 | Liu | G06F 40/45 704/4 |
| 2009/0326917 A1 | 12/2009 | Hegenberger | |
| 2011/0164062 A1 | 7/2011 | Nakamura et al. | |
| 2012/0022852 A1* | 1/2012 | Tregaskis | G06F 40/47 704/E11.001 |
| 2013/0111395 A1 | 5/2013 | Ying et al. | |
| 2014/0223329 A1 | 8/2014 | Falaki et al. | |
| 2014/0333530 A1 | 11/2014 | Agnetta et al. | |
| 2016/0350108 A1* | 12/2016 | Joo | G06F 40/242 |
| 2017/0286451 A1 | 10/2017 | Page | |
| 2017/0351661 A1* | 12/2017 | Lasser | G06F 40/47 |
| 2017/0364512 A1* | 12/2017 | Han | G10L 13/02 |
| 2017/0371866 A1* | 12/2017 | Eck | G06F 40/49 |
| 2018/0101522 A1* | 4/2018 | Fujiwara | G06F 40/51 |
| 2019/0205396 A1 | 7/2019 | Gubanov et al. | |
| 2019/0386951 A1 | 12/2019 | Uhll | |

FOREIGN PATENT DOCUMENTS

| | | |
|---|---|---|
| EP | 749074 B1 | 8/2001 |
| JP | 2004185641 A | 7/2004 |
| RU | 2628202 C1 | 8/2017 |
| RU | 2682002 C2 | 3/2019 |
| TW | 201415256 A | 4/2014 |

OTHER PUBLICATIONS

Notice of Allowance dated Dec. 14, 2020 received in respect of a counterpad Design U.S. Appl. No. 29/651,261.

Russian Search Report dated Feb. 1, 2021 issued in respect of the Russian Patent Application No. RU2019119101.

Yuin-Qian Qu et al., "OOV Translation Mining from Mixed-Language Snippets from a Search Engine", 2008 The 9th International Conference for Young Computer Scientists, Nov. 18-21, 2008, 10.1109/ICYCS.2008.91 https://ieeexplore.ieee.org/document/4709099/metrics#.

Yandex website—Technologies—"Machine Translation" —https://yandex.com/company/technologies/translation/, retrieved on May 27, 2020.

Esther, "10 Basic Apps if you plan to travel to Moscow" 2018, posted at nextination.es, [site visited Jan. 27, 2022]. https://nextination.es/en/10-basic-apps-if-you-plan-to-travel-to-moscow (Year: 2018).

Rocheleau et al.,"U 1/UX Wireframe Examples & Design Analysis" May 19, 2016, posted at vandelaysdesign.com, [site visited Jan. 27, 2022], https://www.vandelaydesign.com/ui-ux-wireframe-examples (Year: 2016).

Notice of Allowance dated Jan. 24, 2022 in respect of the related Design U.S. Appl. No. 29/756,590.

\* cited by examiner

| FRENCH | ENGLISH | SOURCE |
|---|---|---|
| x x x x x x | x x x | BOOK |
| x x x x | x x x x | MOVIE |
| x x x x x x | x x x x | TV SHOW |
| x x x x x | x x x | BOOK |
| x x x x x x | x x | WEB |
| x x x x x x | x x x x x | MOVIE |
| ... | ... | ... |

FIG. 3

METHOD AND SYSTEM OF TRANSLATING A SOURCE PHRASE IN A FIRST LANGUAGE INTO A TARGET PHRASE IN A SECOND LANGUAGE

CROSS-REFERENCE

The present application claims priority to Russian Patent Application No. 2019119101, entitled "Method and System of Translating a Source Phrase in a First Language into a Target Phrase in a Second Language", filed Jun. 19, 2019, the entirety of which is incorporated herein by reference.

FIELD

The present technology generally relates to machine translation, and more particularly, to a system and method for translating a source phrase in a first language into a target phrase in a second language.

BACKGROUND

With the growth of users accessing the Internet, a vast amount of Internet based services has surfaced. Such services include, for example, search engine service (such as Yandex™ search engine, Google™ search engine, and the like), social network service (such as Facebook™ service), multimedia service (such as, Instagram™ service and YouTube™ service), and translation service (such as Yandex-.Translate™ application). The latter service has been particularly useful in allowing users to easily translate a text (or even a recording of or a live speech) from one natural language (usually one that a given user does not fully understand) into another (usually one that the given user understands).

The automatic translation of a text from one language into another is a topic with growing interests, especially with the advance in computer technology. Indeed, the recent advances in the ability for the computer to rapidly process a variety of information while using less memory space have contributed to the significant improvement in the field of machine translation.

Conventionally, efforts have been focused on providing exact translation of phrases from a source language to a target language. However, no matter how good the translation of a phrase is, the user may still have difficulty in appreciating how to use the translated word. This is mainly due to the fact that language structure is quite relevant, and each language has a different language structure from one another. To address this issue, some efforts have been made to display, together with the translated phrase, sentences comprising the translated phrase, so as to provide guidance to the user in properly appreciating the translated phrase.

Efforts have also been made to provide the user with a better appreciation of the translated word by providing example sentences using the translated word, together with corresponding sentences in the source language.

Chinese Patent Application Publication No. 102236643 A published Nov. 9, 2011 to Inventec Corp., and entitled "Processing System and Method capable of Simultaneously Displaying Multilingual Words and Example Sentences" discloses a processing system and method for simultaneously displaying multi-lingual words and example sentences, which, after receiving a source language word, extract a corresponding target language word from the first dictionary and to the second dictionary to extract the word interpretation. After the target language example is translated into the source language, all the corresponding query results are displayed together in the same window, thereby simplifying the cross-matching process when querying the translated words, thereby improving the query performance.

Chinese Patent Application Publication No. 104133561 A, published Nov. 5, 2011 to Baidu Online Network Technology Beijing Co. Ltd., and entitled "Auxiliary Information Display Method and Device based on Input Method" discloses an auxiliary information display method and device based on an input method. The auxiliary information display method includes the steps of receiving character strings input by a user, recognizing words in the character strings according to preset rules when it is detected that the character strings include preset characters, obtaining auxiliary information related to the words, and displaying the combination of the auxiliary information and the words in an interface. According to the auxiliary information display method based on the input method, the user only needs to input the words to obtain translation of the words and example sentences in different semantic conditions, and the user can quickly know usage of the words conveniently in the writing process.

SUMMARY

It is an object of the present technology to provide improved method and systems for translating a source phrase in a first language to a target phrase in a second language.

Without wishing to be bound to any specific theory, embodiments of the present technology have been developed based on an assumption that user using the translation service may appreciate example sentences comprising the translated phrase, together with sentences in the source language. The prior art method of achieving such require the translation of the example sentences back into the source language using a translation algorithm. Needless to say, this method is computationally extensive, and although modern translation algorithms are capable of generally providing acceptable translation of sentences, there remains a risk of providing unclear, or incorrect translation of the sentence in the source language.

Moreover, embodiments of the present technology has been also developed based on an assumption of the developers that in order for the user to fully appreciate the translated phrase in an in-use context, it would be preferable to provide example sentences that are native to the target language.

In order to reduce the risks of providing unclear or incorrect examples of sentences (and their translation), it is contemplated that by building a list of parallel sentences in the source language and the target language retrieved from human-generated content, it would be possible to provide accurate example sentences both in the target language and the source language.

In accordance with a first broad aspect of the present technology, there is provided a computer-implemented method for translating a source phrase in a first language into a second language. The method is executable by a computer device configured to access an index, the index comprising a set of source sentences in the first language, and a set of target sentences in the second language, each of the target sentence included within the set of target sentences corresponding to a translation of a given source sentence within the set of source sentences. The method comprises: acquiring the source phrase; generating by a translation algorithm, one or more target phrases, each of the one or more target phrases having a different semantic meaning within the second language; retrieving, from the index, a respective target sentence for each of the one or more target phrases, the respective target sentence comprising one of the one or more target phrases; and selecting each of the one or more target phrase and the respective target sentences for display.

In some non-limiting embodiments of the method, the method further comprises retrieving, from the index, one or more source sentences in the first language, each of the one or more source sentences corresponding to the translation of each respective target sentences; and selecting, the one or more source sentences for display.

In some non-limiting embodiments of the method, the one or more target phrases comprises a first target phrase; the plurality of target sentences comprises a first sentence and a second sentence that includes the first target phrase; and the retrieving the one or more target sentences comprises retrieving one of the first sentence and the second sentence.

In some non-limiting embodiments of the method, the retrieving one of the first sentence and the second sentence comprises: ranking, the first sentence and the second sentence; retrieving a highest ranked one of the first sentence and the second sentence as one of the one or more target sentences.

In some non-limiting embodiments of the method, the ranking the first sentence and the second sentence comprises: determining a first set of features associated with the first sentence, the first set of features being representative of a pertinence of the first sentence; determining a second set of features associated with the second sentence, the second set of features being representative of the pertinence of the second sentence; ranking the first sentence and the second sentence based on the first set of features and the second set of features.

In some non-limiting embodiments of the method, the first set of features include at least one of: a source of the first sentence; a number of words included within the first sentence; and a popularity parameter associated with the source.

In some non-limiting embodiments of the method, the index further comprises an indication of a source for each of the plurality of target sentences, the source being one of: a book; a website; and a video.

In some non-limiting embodiments of the method, the selecting the one or more target sentences and the one or more target phrases for display further comprises selecting a respective indication of the source of each of the one or more target sentences for display In some non-limiting embodiments of the method, the computer device is a server coupled to a client device via a communication network; the acquiring the source phrase comprises receiving the source phrase from the client device; and wherein the selecting the one or more target sentences and the one or more target phrases for display comprises: transmitting the one or more target sentences and the one or more target phrases to the client device for display.

In accordance with another broad aspect of the present technology, there is disclosed a computer device for translating a source phrase in a first language into a second language, the computer device being configured to access an index, the index comprising a set of source sentences in the first language, and a set of target sentences in the second language, each of the target sentence included within the set of target sentences corresponding to a translation of a given source sentence within the set of source sentences. The computer device comprises a processor configured to acquire the source phrase; generate by a translation algorithm, one or more target phrases, each of the one or more target phrases having a different semantic meaning within the second language; retrieve, from the index, a respective target sentence for each of the one or more target phrases, the respective target sentence comprising one of the one or more target phrases; and select each of the one or more target phrase and the respective target sentences for display.

In some non-limiting embodiments of the computer device, processor is further configured to: retrieve, from the index, one or more source sentences in the first language, each of the one or more source sentences corresponding to the translation of each respective target sentences; and select, the one or more source sentences for display.

In some non-limiting embodiments of the computer device, the one or more target phrases comprises a first target phrase; the plurality of target sentences comprises a first sentence and a second sentence that includes the first target phrase; and wherein to retrieve the one or more target sentences, the processor is configured to retrieve one of the first sentence and the second sentence.

In some non-limiting embodiments of the computer device, to retrieve the one of the first sentence and the second sentence, the processor is configured to: rank, the first sentence and the second sentence; and retrieve a highest ranked one of the first sentence and the second sentence as one of the one or more target sentences.

In some non-limiting embodiments of the computer device, to rank the first sentence and the second sentence, the processor is configured to: determine a first set of features associated with the first sentence, the first set of features being representative of a pertinence of the first sentence; determine a second set of features associated with the second sentence, the second set of features being representative of the pertinence of the second sentence; rank the first sentence and the second sentence based on the first set of features and the second set of features.

In some non-limiting embodiments of the computer device, the first set of features include at least one of: a source of the first sentence; a number of words included within the first sentence; and a popularity parameter associated with the source.

In some non-limiting embodiments of the computer device, the index further comprises an indication of a source for each of the plurality of target sentences, the source being one of: a book; a website; and a video.

In some non-limiting embodiments of the computer device, to select the one or more target sentences and the one or more target phrases for display, the processor is further configured to select a respective indication of the source of each of the one or more target sentences for display.

In some non-limiting embodiments of the computer device, the computer device is a server coupled to a client device via a communication network; to acquire the source phrase the processor is configured to receive the source phrase from the client device; and wherein to select the one or more target sentences and the one or more target phrases for display, the processor is configured to: transmit the one or more target sentences and the one or more target phrases to the client device for display.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 3 depicts a schematic illustration of a list of parallel sentences stored within the database of the system of FIG. 1.

DETAILED DESCRIPTION

Figure 1:
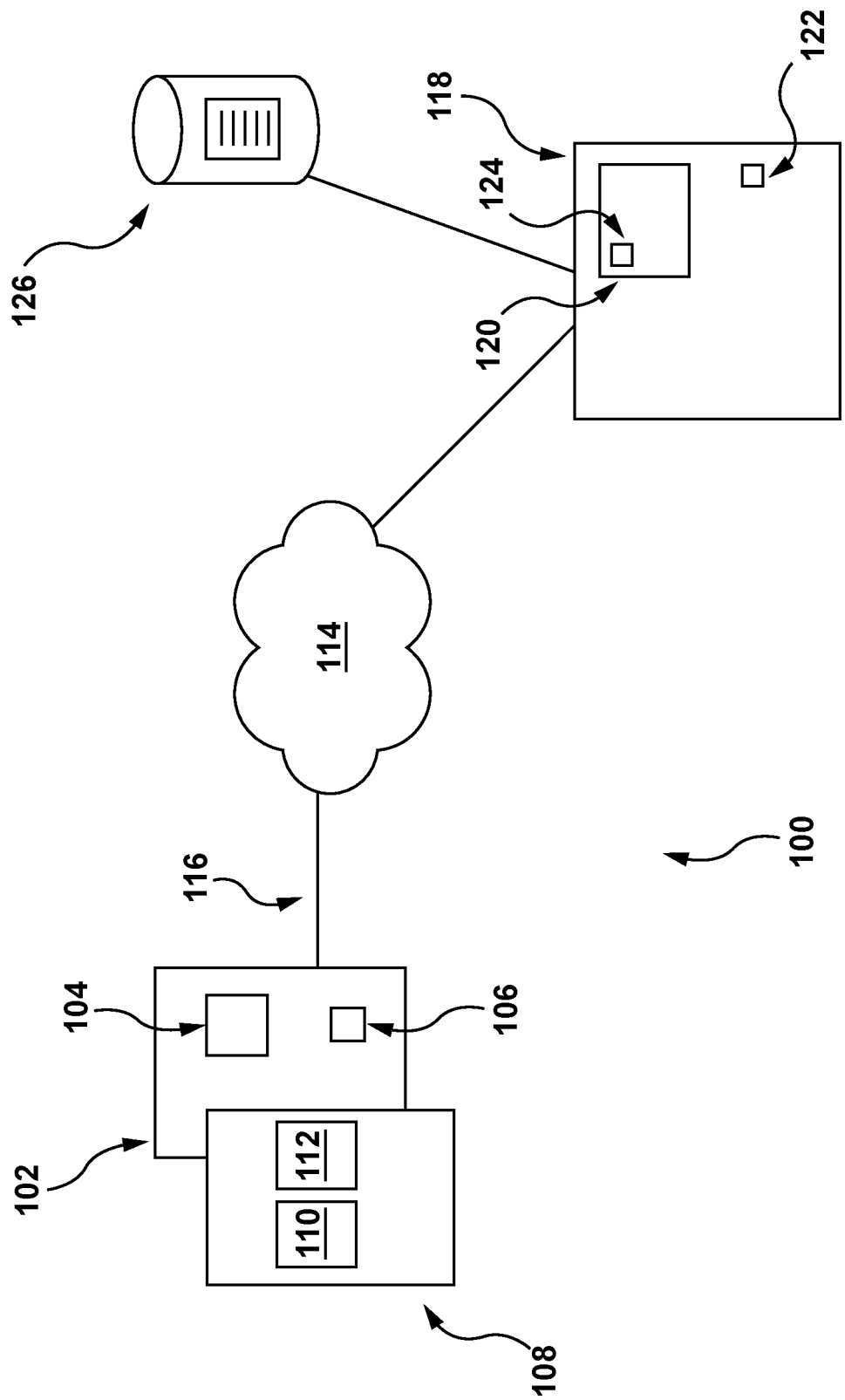
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art, to access a translation application 108. Generally speaking, the purpose of the translation application 108 is to enable the user (not shown) to translate a corpus of text in a first language into a second language (described below). To that end, the translation application 108 comprises a translation input area 110 and a translation output area 112.

How the translation application 108 is implemented is not particularly limited. One example of the translation application 108 may be embodied in the user (not shown) accessing, via a browsing application (not shown) a web site associated with a translation service (such as Yandex.Translate™ application) to access the translation application 108. For example, the translation application 108 can be accessed by typing in a uniform resource locator (URL) associated with Yandex.Translate™ network resource. It should be expressly understood that the translation application 108 can be accessed using any other commercially available or proprietary online translation service.

In alternative non-limiting embodiments of the present technology, the translation application 108 may be implemented as a downloadable application on an electronic device (such as a wireless communication device or a stationary electronic device). For example, where the electronic device 102 is implemented as a portable device, such as for example, Samsung™ Galaxy™ S9, the electronic device 102 may be executing a Yandex.Translate™ application. It should be expressly understood that any other commercially available or proprietary translation application can be used for implementing non-limiting embodiments of the present technology.

Generally speaking, the electronic device 102 comprises a user input interface (not shown) (such as a keyboard, touch screen, mouse, and the like) for receiving user inputs into, for example, the translation input area 110. How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

The electronic device 102 is coupled to a communication network 114 via a communication link 116. In some non-limiting embodiments of the present technology, the communication network 114 can be implemented as the Internet. In other embodiments of the present technology, the communication network 114 can be implemented differently, such as any wide-area communications network, local-area communications network, a private communications network and the like.

How the communication link 116 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means, examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 114) via the communication network 114.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments of the present technology, the server 118 can be operated by the same entity that has provided the afore-described electronic translation application 108. For example, the server 118 can be operated by Yandex LLC of Lev Tolstoy Street, No. 16, Moscow, 119021, Russia. In alternative embodiments, the server 118 can be operated by an entity different from the one providing the aforementioned electronic translation application 108.

In some embodiments of the present technology, the server 118 executes a translation generating application 124. The manner in which the translation generating application 124 is implemented is described in detail below. For now, suffice to say that the translation generating application 124 is configured to receive and execute the translation of a corpus of text, entered by the user (not shown) into the translation input area 110, from a first language into a user-selectable second language. The translation generating application 124 is further configured to transmit the generated translation to the electronic device 102, to be displayed to the user of the electronic device 102 via the translation output area 112.

Figure 2:
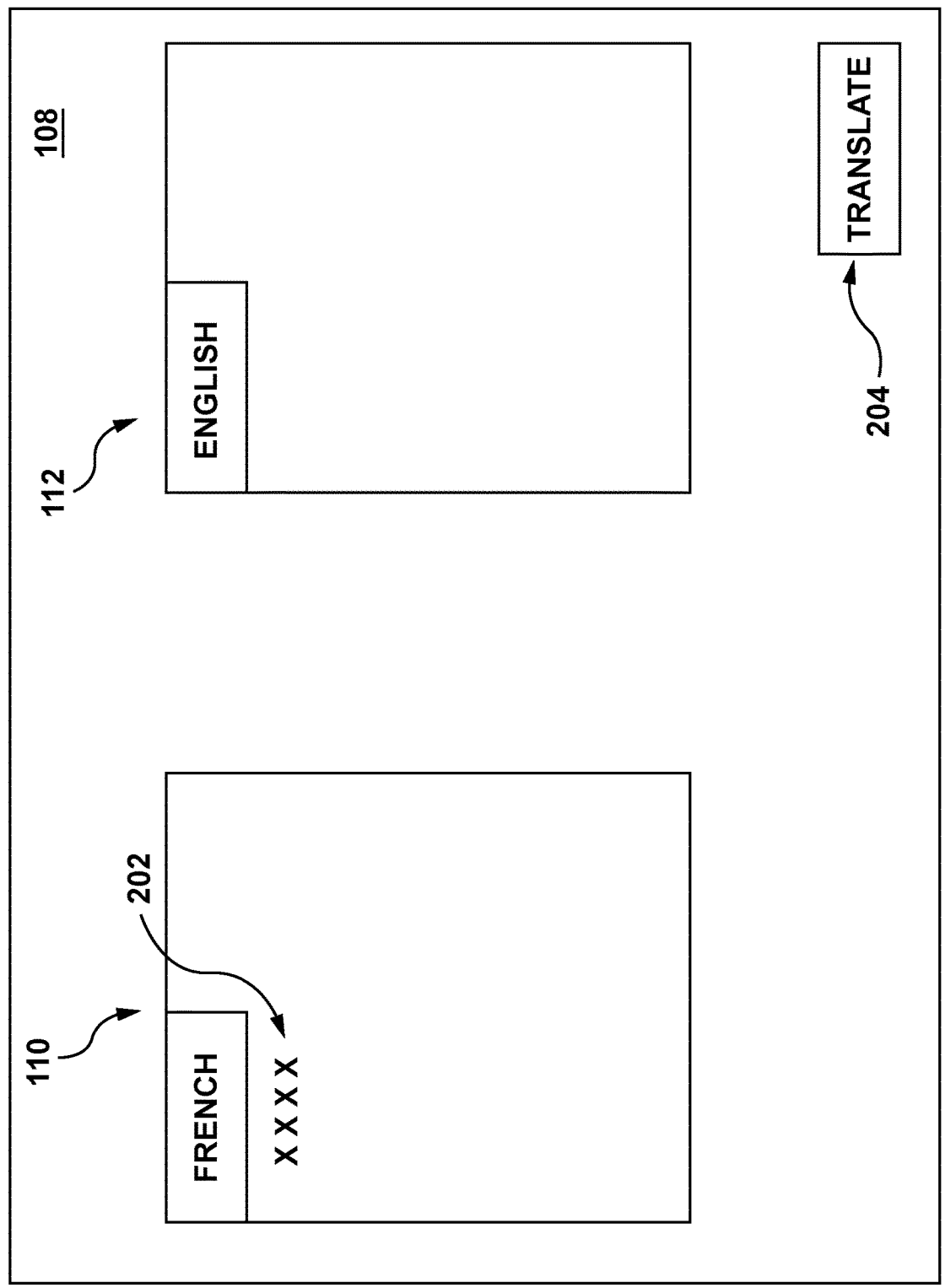
FIG. 2 depicts a screenshot of a translation service executed by the electronic device of the system of FIG. 1.

With brief reference to FIG. 2, which depicts a screenshot of an interface of the translation application 108 including an input phrase 202 within the translation input area 110. In some embodiments, the input phrase 202 is a natural language text written in a first language (in this case, French). The manner in which the input phrase 202 is inputted into the translation input area 110 is not limited, and may for example be user inputted via the user input interface (not shown) or via a copy-paste from (for example) a network resource such as a web page (not shown). In the context of the present specification, the term "phrase" may refer to a single word or a group of words.

For the avoidance of any doubt, it should be mentioned that the input phrase 202 (and more specifically each letter) is represented by an "X", however, in reality the input phrase 202 is made of letters or words in a given language (in this case, French). For example, the input phrase 202 may correspond to "fier".

In some non-limiting embodiments of the present technology, the translation application 108 comprises a user-actuation button 204 which is configured to cause execution of the translation of the input phrase 202 into a user-selected language (in this case, English), which will be displayed in the translation output area 112. Needless to say, although in the given example, the translation application 108 is illustrating a translation of a French phrase into an English phrase, it is not limited as such, and may be configured to translate from any language to any another.

Referring back to FIG. 1, the server 118 is communicatively coupled to a database 126. In alternative non-limiting embodiments, the database 126 may be communicatively coupled to the server 118 via the communication network 114. Although the database 126 is illustrated schematically herein as a single entity, it is contemplated that the database 126 may be configured in a distributed manner.

The database 126 is populated with a plurality of parallel sentences (not separately numbered). More precisely, the database 126 comprises a plurality of sentences in a first language (such as French), and a corresponding translation of each of the plurality of sentences in a second language (such as English).

Referring to FIG. 3, there is depicted a schematic illustration of an index 302 of parallel sentences stored within the database 126.

The index 302 comprises a plurality of sentence pairs 304. The plurality of sentence pairs 304 comprises a first plurality of sentences 306 in a first language (in this case, in French), and a second plurality of sentences 308 in a second language (in this case, in English). The first plurality of sentences 306 and the second plurality of sentences 308 form the plurality of sentence pairs 304 such that each one of the plurality of sentence pairs 304 has a given sentence from the first plurality of sentences 306 and a respective parallel sentence from the second plurality of sentences 306.

For example, the plurality of sentence pairs 304 comprises a sentence pair 310. In this example, the sentence pair 310 comprises (i) a first sentence 312 in the first language (e.g., French), and (i) a second sentence 314 in the second language (e.g., English) which is a translation of the first sentence 312.

How the first sentence 312 and the second sentence 314 have been identified and stored within the database 126 is not limited. For example, an operator associated with the translation generating application 124 may have identified and extracted the first sentence 312 from the French version of a given web page, while the second sentence 314 may have been identified and extracted by the English version of the given web page. Additionally, then first sentence 312 may be extracted from other sources in French, such as an electronic book, a movie, a TV show and the like, provided that the source has been previously translated in the English language, by a human translator for example, or vice-versa.

In some non-limiting embodiments of the present technology, the first plurality of sentences 306 are retrieved from a source that is native to the language associated with the first plurality of sentences 306. In other words, recalling that the first plurality of sentences 306 include sentences in French, the first plurality of sentences 308 are extracted from sources that are native to the French language. For example, the first sentence 312 (which is included in the first plurality of sentences 306) may be retrieved from an electronic book corresponding to the "Les Trois Mousquetaires" ("The Three Musketeers") from Alexandre Dumas, originally written in French, and the second sentence 314 corresponds to the English translation of the first sentence 312.

Alternatively, in some non-limiting embodiments of the present technology, the second plurality of sentences 308 are retrieved from a source that is native to the language associated with the second plurality of sentences 308. In other words, recalling that the second plurality of sentences 308 include sentences in English, the second plurality of sentences 308 are extracted from sources that are native to the English language. For example, the second sentence 314 (which is included in the second plurality of sentences 308) may be retrieved from an electronic book corresponding to "Hamlet" from Shakespeare, originally written in English, and the first sentence 312 corresponds to the French translation of the second sentence 314.

In some non-limiting embodiments of the present technology, the index 302 further includes an indication 316 of a source associated with each of the plurality of sentence pairs 304. For example, assuming that the sentence pair 310 has been extracted from a book, the indication 316 comprises an indication of the book (such as the title, author, year of publication, and the like).

Figure 4:
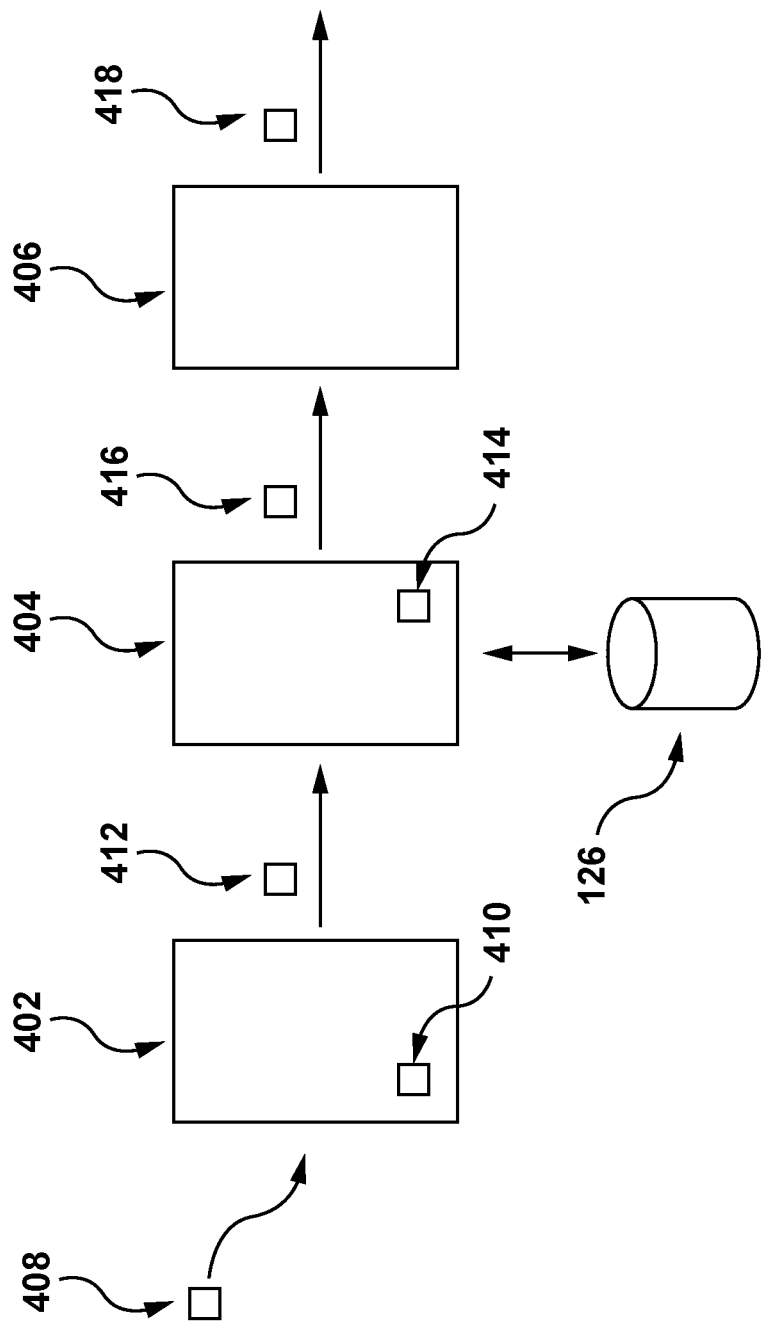
FIG. 4 depicts an example of a process of translating a source phrase in a first language to a target phrase in a second language.

Functions and operations of the various components of the translation generating application 124 will now be described in more details. With reference to FIG. 4, there is depicted a schematic illustration of the translation generating application 124 for translating the input phrase 202 received by the electronic device 102 in response to, for example, the user actuating the user-actuation button 204. The translation generating application 124 executes (or otherwise has access to): a translation routine 402, a retrieving routine 404 and a displaying routine 406.

In the context of the present specification, the term "routine" refers to a subset of the computer executable program instructions of the translation generating application 124 that is executable by the server processor 122 to perform the functions explained below in association with the various routines (the translation routine 402, the retrieving routine 404, and the displaying routine 406). For the avoidance of any doubt, it should be expressly understood that the translation routine 402, the retrieving routine 404 and the displaying routine 406 are illustrated schematically herein in a separate and distributed manner for ease of explanation of the processes executed by the translation generating application 124. It is contemplated that some or all of the translation routine 402, the retrieving routine 404 and the displaying routine 406 may be implemented as one or more combined routine.

For ease of understanding the present technology, functionality of each one of the translation routine 402, the retrieving routine 404 and the displaying routine 406, as well as data and/or information processed or stored therein are described below.

Translation Routine

The translation routine 402 is configured to receive a data packet 408 which comprises the input phrase 202 from the electronic device 102.

The translation routine 402 is configured to, or otherwise has access to, a translation algorithm 410. In some non-limiting embodiments of the present technology, the translation algorithm 410 is implemented as a phrase-based statistical translation model. In some non-limiting embodiments of the present technology, the translation algorithm 410 is implemented as a neural network translation model. In additional non-limiting embodiments of the present technology, the translation algorithm 410 is implemented as a combination of the phrase-based statistical translation model and the neural network translation model as disclosed in U.S. patent application Ser. No. 16/031,021 entitled METHOD AND SYSTEM OF TRANSLATING A SOURCE SENTENCE IN A FIRST LANGUAGE INTO A TARGET SENTENCE IN A SECOND LANGUAGE filed Jul. 10, 2018, the content of which is incorporated by reference herein in its entirety.

Irrespective of which translation algorithm 410 is used and broadly speaking, in response to receiving the data packet 408, the translation algorithm 410 is configured to generate one or more phrases in the target language (i.e. English).

Figure 5:
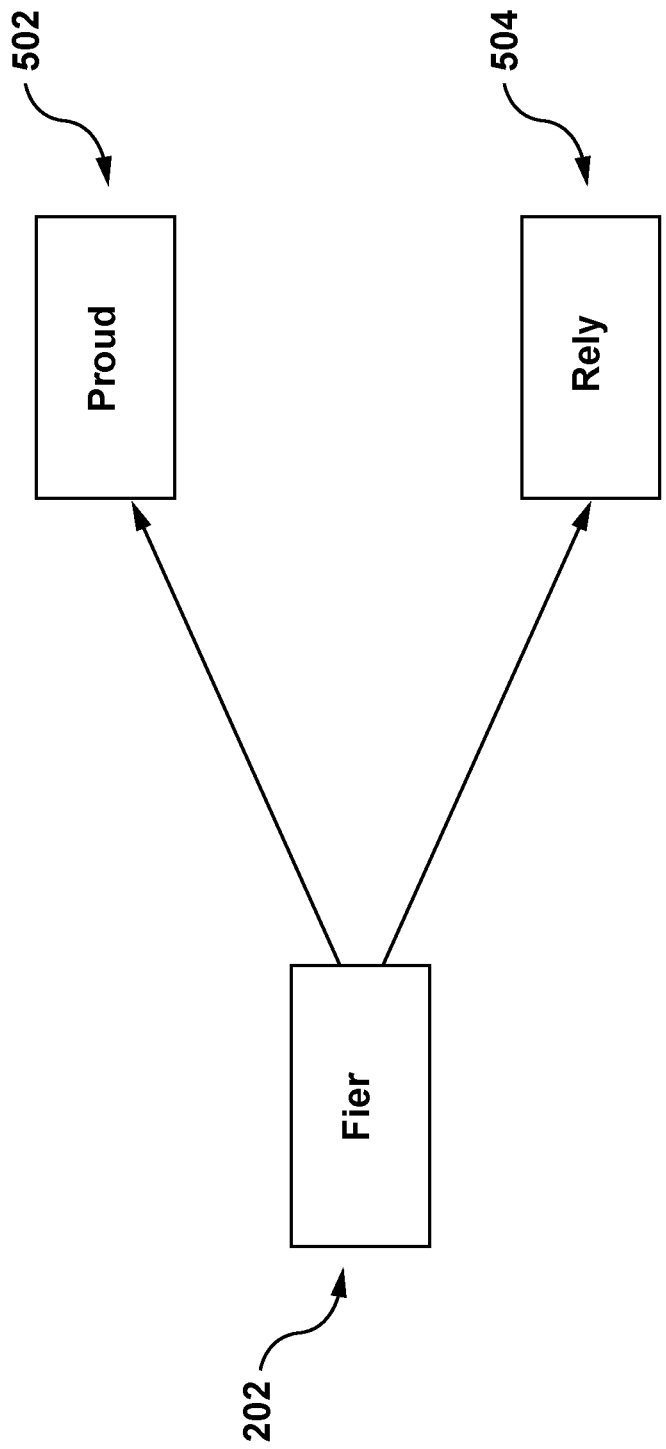
FIG. 5 depicts schematic diagram of the input phrase being translated from the source language into the target language.

Briefly referring to FIG. 5, there is depicted a schematic diagram of the input phrase 202 being translated from the source language (French) into the target language (English). Let us assume for example, that the input phrase 202 corresponds to the French word "fier". In this particular example, the input phrase 202 is a homograph, meaning that the input phrase 202 shares the same written form as another word but has a different meaning (in this particular example, it has two different semantic meaning in French). Accordingly, the translation algorithm 410 has translated the input phrase 202 and generated a first translation 502 ("proud") and a second translation 504 ("rely"). Needless to say, the present technology is not limited to input phrases that are homographs.

Returning to FIG. 4, having generated the first translation 502 and the second translation 504, the translation routine 402 is configured to transmit a data packet 412 to the retrieving routine 404. The data packet 412 comprises the first translation 502 and the second translation 504.

Retrieving Routine

In response to receiving the data packet 412, the retrieving routine 404 is configured to execute the following functions.

Firstly, the retrieving routine 404 is configured to access the database 126, and retrieve one or more sentences for each translation included within the data packet 412. More precisely, recalling that the data packet 412 comprises the first translation 502 and the second translation 504, the retrieving routine 404 is configured to access the database 126 and retrieve, for each of the first translation 502 and the second translation 504, one or more sentences from the second plurality of sentences 308 that include the first translation 502 and the second translation 504.

Figure 6:
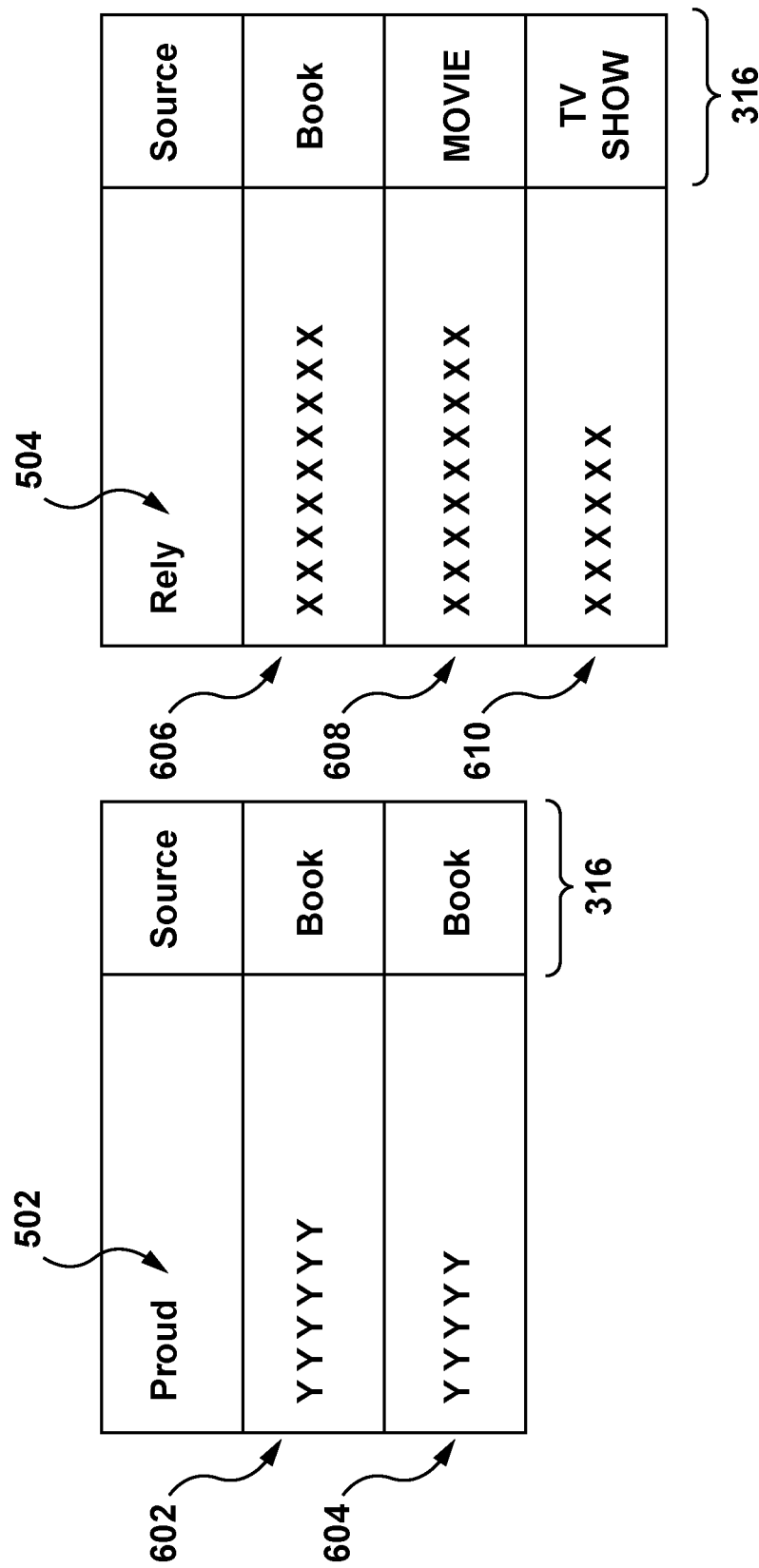
FIG. 6 depicts a schematic diagram of one or more sentences comprising the first translation or the second translation, retrieved from the database of the system of FIG. 1.

With brief reference to FIG. 6, there is depicted a schematic diagram of one or more sentences that include the first translation 502 or the second translation 504, retrieved from the second plurality of sentences 308.

More particularly, the retrieving routine 404 has retrieved two sentences from the plurality of sentences 308 that include the first translation 502, namely a first sentence 602 and a second sentence 604. The retrieving routine 404 has also retrieved three sentences from the plurality of sentences 308 that include the second translation 504, namely a third sentence 606, a fourth sentence 608 and a fifth sentence 610.

Needless to say, although in FIG. 6, only two sentences have been retrieved for the first translation 502 (and three sentences for the second translation 504), it is done so for ease of understanding and it should be understood that only one, or more than two sentences may be retrieved for the first translation 502.

Each of the retrieved sentences (i.e. the first sentence 602, the second sentence 604, the third sentence 606, the fourth sentence 608 and the fifth sentence 610) is associated with a respective indication 316 of the source. For example, assuming the first sentence 602 is retrieved from the book "The Old Man and the Sea", the indication 316 of the source includes at least one of the title ("The Old Man and the Sea"), the author (Ernest Hemingway), and the date of publication (1952). As it will be described in more details below, the indication 316 of the source may be displayed, in some non-limiting embodiments of the present technology, as the source of example sentences displayed to the user in response to the user clicking on the user-actuation button 204 (see FIG. 2).

In some non-limiting embodiments of the present technology, the retrieving routine 404 is configured to execute a machine learning algorithm (MLA) 414 that is configured to rank the retrieved sentences for each of the first translation 502 and the second translation 504. More precisely, the MLA 414 is trained to rank the one or more retrieved sentences by order of pertinence to the respective translation (i.e. the first translation 502 and the second translation 504). How the MLA 414 is trained is not limited, and may for example be trained on a set of features comprising one or more of, but not limited to:

The number of words included in the retrieved sentence;
A type of the source associated with the retrieved sentence; and
A popularity (described below) of the source associated with the retrieved sentence.

How the popularity of the source is determined is not limited. For example, the server 118 may be coupled to a query log (not illustrated) that stores one or more text strings representative of search queries that were submitted by a plurality of users using a search engine service (such as Yandex™ search engine), and determine the popularity of the source based on a frequency of the source being included in the search query.

In an additional example, the server 118 may be coupled to a search log (not illustrated) that stores one or more search engine result pages (SERPs) generated in response to one or more search queries submitted by the plurality of users using the search engine service, as well as search actions executed by the plurality of users, and determine the popularity of the source based on a frequency of the source being included within the SERPs and/or clicked as a search result in a given SERP by the plurality of users.

In some non-limiting embodiments of the present technology, the retrieving routine 404 is then configured to select an n-number of highest ranked sentences for each of the translation (i.e. the first translation 502 and the second translation 504). Just as a non-limiting example, the retrieving routine 404 may be configured to select two highest-ranked sentences for each of the first translation 502 and the second translation 504. Needless to say, it is contemplated that the retrieving routine 404 be configured to select more than two highest-ranked sentences or even just a single, the highest ranked, sentence.

Let us assume, for example, that the MLA 414 has selected the first sentence 602 and the second sentence 604 as the two highest ranked sentences for the first translation 502, and the fourth sentence 608 and the fifth sentence 610 as the two highest ranked sentences for the second translation 504.

The retrieving routine 404 is then configured to transmit a data packet 416 to the displaying routine 406. The data packet 416 comprises the two highest-ranked sentences for each of the first translation 502 and the second translation 504.

Displaying Routine

In response to receiving the data packet 416, the displaying routine 406 is configured to transmit a trigger 418 to the electronic device 102 via the communication network 114. The trigger 418 contains the first translation 502, the second translation 504, the highest ranked sentences for each of the first translation 502 and the second translation 504 and, optionally, additional information described below. In some non-limiting embodiments of the present technology, the trigger 418 is embodied in a JavaScript Object Notation (JSON) message. Alternatively, the trigger 418 can be embodied in an Extensible Markup Language (XML) message. Naturally, the trigger 418 can be embodied in a plethora of additional suitable formats of messages.

For the explanation of the illustration to be presented herein below, it shall be assumed that the trigger 418 contains information instrumental in causing the electronic device 102 to display to the user a translation result, as will be illustrated momentarily.

Figure 7:
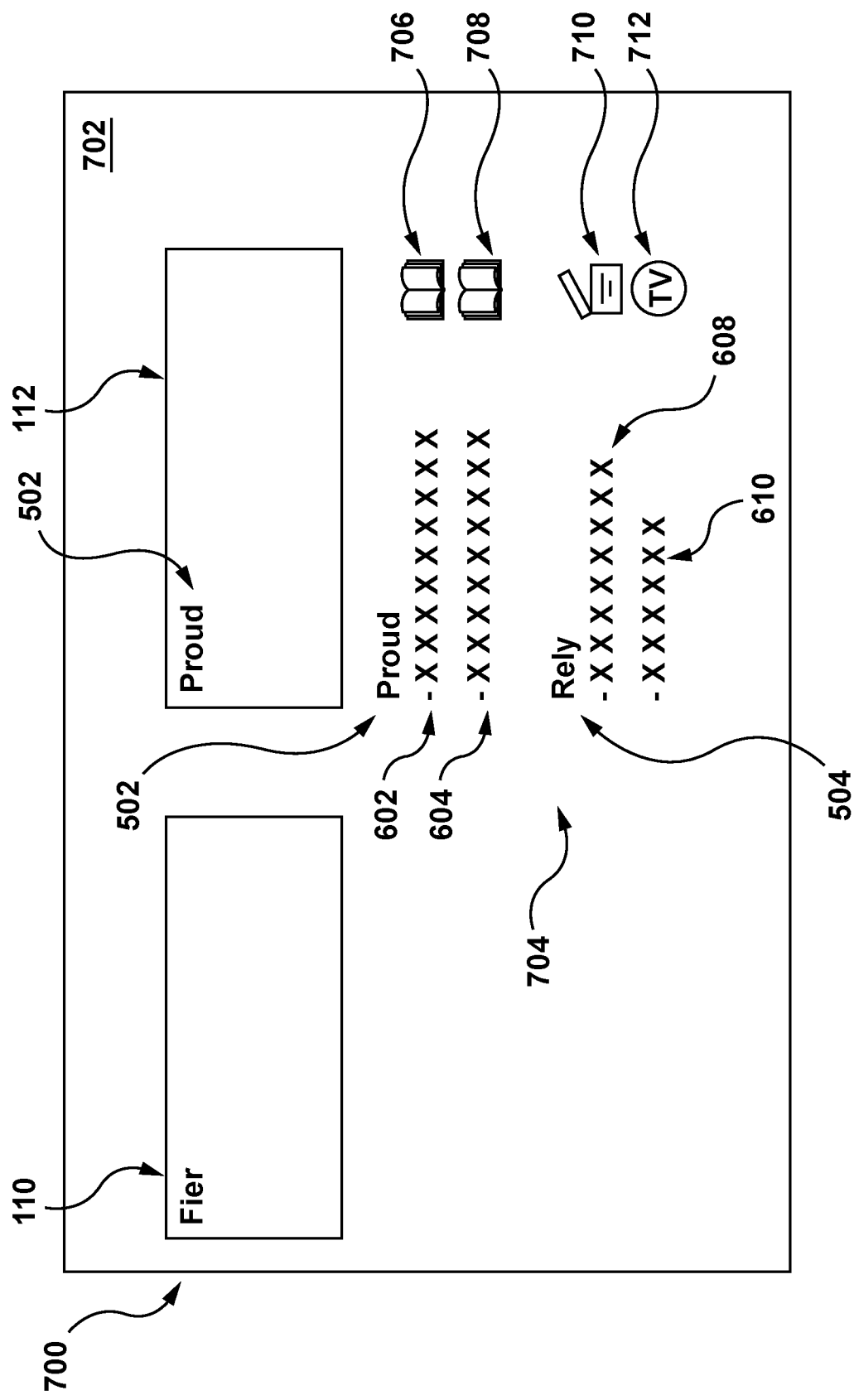
FIG. 7 is a screen shot of a graphical user interface implemented in accordance with a first non-limiting embodiment of the present technology.

With reference to FIG. 7, there is depicted a screen shot 700, the screen shot 700 illustrating a graphical user interface (GUI) 702, the GUI 702 being implemented in accordance with non-limiting embodiments of the present technology and generated by the electronic device 102 in response to receiving the trigger 418.

Within this illustration, let it be assumed that the input phrase 202 (see FIG. 2) entered by the user corresponds to the French word "fier", and the user clicked the user-actuation button 204. The user is presented with the GUI 702, a screen shot of which is represented in FIG. 7 as the screen shot 700.

Within the screen shot 700, the user is presented with the first translation 502 provided within the translation output area 112. Needless to say, it is contemplated that both the first translation 502 and the second translation 504 (or only the second translation 504) can be provided within the translation output area 112.

Below the translation output area 112, there is provided a secondary output area 704, where each of the first translation 502 and the second translation 504 are displayed together with their associated sentences (the first sentence 602, the second sentence 604, the fourth sentence 608 and the fifth sentence 610).

Recalling that in some non-limiting embodiments of the present technology, the first sentence 602, the second sentence 604, the fourth sentence 608 and the fifth sentence 610 are retrieved from a respective source that is native to the English language, it should be appreciated that the user is provided with real in-use example sentences of each of the first translation 502 and the second translation 504 in the target language (i.e. English).

For example, the first sentence 602 and the second sentence 604 are provided below the first translation 502. The fourth sentence 608 and the fifth sentence 610 are provided below the second translation 504. Needless to say, the positioning of the sentences need not to be below the first translation 502 and/or second translation 504, and may be positioned close to the respective translation in any other directions. For example, the first sentence 602 and the second sentence 604 may be positioned on either one of the right side or the left side of the first translation 502.

In some non-limiting embodiments of the present technology, it is contemplated that a phonetic notation, implemented for example using the international phonetic alphabet, of each of the first translation 502 and the second translation 504 can be displayed in the GUI 702. How the phonetic notation of each of the first translation 502 and the second translation 504 is retrieved is not limited, and for example, the displaying routine 406 may have access to a dictionary application (not shown) from which it may retrieve the phonetic notation associated with each of the first translation 502 and the second translation 504.

In some non-limiting embodiments of the present technology, the GUI 702 includes a favicon next to each of the sentence indicative of its source. Recalling that the source of the first sentence 602 is a book, the GUI 702 includes a first favicon 706 next to the first sentence 602 illustrating a book. The GUI 702 also includes a second favicon 708 next to the second sentence 604 illustrating a book. The GUI 702 further includes a third favicon 710 next to the fourth sentence 608 illustrating a movie. The GUI finally includes a fourth favicon 712 next to the fifth sentence 610 illustrating a TV show.

In some non-limiting embodiments of the present technology, the user may interact with one of the favicons (i.e. the first favicon 706, the second favicon 708, the third favicon 710 and the fourth favicon 712) to obtain more information about the source. For example, in response to the user hovering or actuating the first favicon 706, a snippet (not shown) comprising the title, and author and year of publication may appear.

Figure 8:
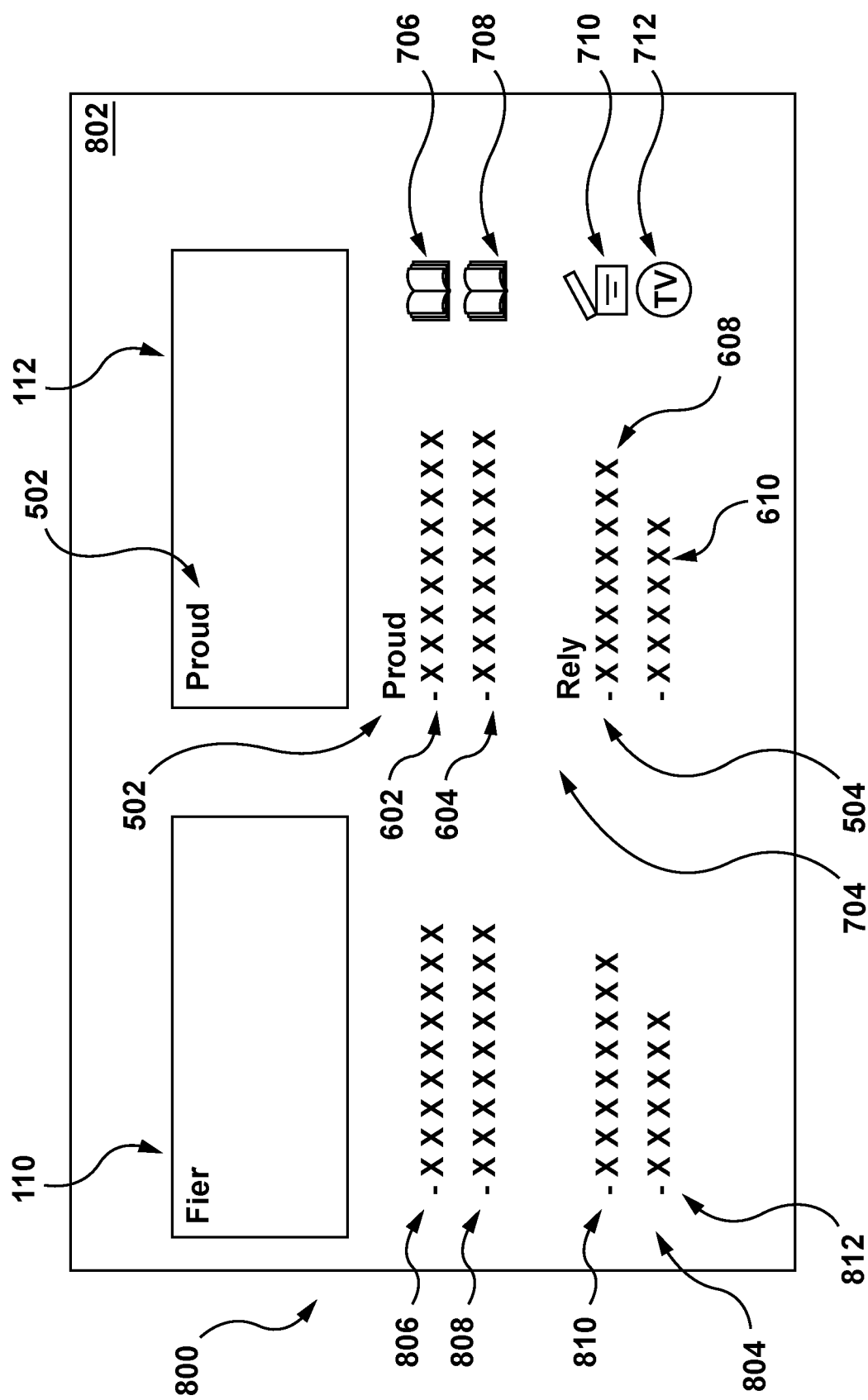
FIG. 8 is a screen shot of a graphical user interface implemented in accordance with a second non-limiting embodiment of the present technology.

Referring to FIG. 8, there is depicted an alternative embodiment of a screen shot 800, the screen shot 800 illustrating a GUI 802, the GUI 802 being implemented in accordance with non-limiting embodiments of the present technology and generated by the electronic device 102 in response to receiving the trigger 418.

For simplicity, elements or functions of the GUI 802 that are similar to the elements or functions of the GUI 702 have been labelled with the same reference numerals. New elements or functions not disclosed within the GUI 702 have been labelled with additional reference numerals.

Within this illustration, let it be assumed again that the input phrase 202 (see FIG. 2) entered by the user corresponds to the French word "fier", and the user clicked the user-actuation button 204. The user is presented with the GUI 802, a screen shot of which is represented in FIG. 8.

Similar to the GUI 702, there is provided the secondary output area 704 below the translation output area, where each of the first translation 502 and the second translation 504 are displayed together with their associated sentences. For example, the first sentence 602 and the second sentence 604 are provided below the first translation 502. The fourth sentence 608 and the fifth sentence 610 are provided below the second translation 504.

Now, below the translation input area 110, there is provided a secondary input area 804, which comprises a translation (in French) of each of the first sentence 602, the second sentence 604, the fourth sentence 608 and the fifth sentence 610.

More precisely, the secondary input area 804 comprises a first translation sentence 806 corresponding to the translation of the first sentence 602, a second translation sentence 808 corresponding to a translation of the second sentence 604, a third translation sentence 810 corresponding to a translation of the fourth sentence 608, and a fourth translation sentence 812 corresponding to a translation of the fifth sentence 610.

As it would be appreciated, by displaying sentences associated with the first translation 502 and the second translation 504 together, in parallel with their corresponding sentences in the source language, the user is provided with examples of sentences in both the source language and the target language, which may help the user appreciate better the first translation 502 and the second translation 504.

The manner in which the first translation sentence 806, the second translation sentence 808, the third translation sentence 810 and the fourth translation sentence 812 are generated is not limited.

In some non-limiting embodiments of the present technology, in response to receiving the data packet 416, the displaying routine 406 may be configured to access the database 126 to retrieve, from the first plurality of sentences 306, the translation of the first sentence 602, the second sentence 604, the fourth sentence 608 and the fifth sentence 610.

In some non-limiting embodiments, instead of the displaying routine 406, it is also contemplated that the retrieving routine 404 be configured to retrieve from the plurality of sentences 306 the first translation sentence 806, the second translation sentence 808, the third translation sentence 810 and the fourth translation sentence 812 together with the first sentence 602, the second sentence 604, the fourth sentence 608 and the fifth sentence 610.

In some non-limiting embodiments, the displaying routine 406 may be configured to access the translation algorithm 410 (see FIG. 4) and generate the first translation sentence 806, the second translation sentence 808, the third translation sentence 810 and the fourth translation sentence 812 by translating the first sentence 602, the second sentence 604, the fourth sentence 608 and the fifth sentence 610, respectively.

Although the description of the translation generating application 124 has been done with reference to the server 118, it is not limited as such. It would be understood that the translation generating application 124 may be implemented within other devices. For example, and not as a limitation, the translation generating application 124 (as well as the index 302) may be downloaded and stored within the electronic device 102.

The various non-limiting embodiments of the present technology may allow the display of example sentences for each translated phrase.

Figure 9:
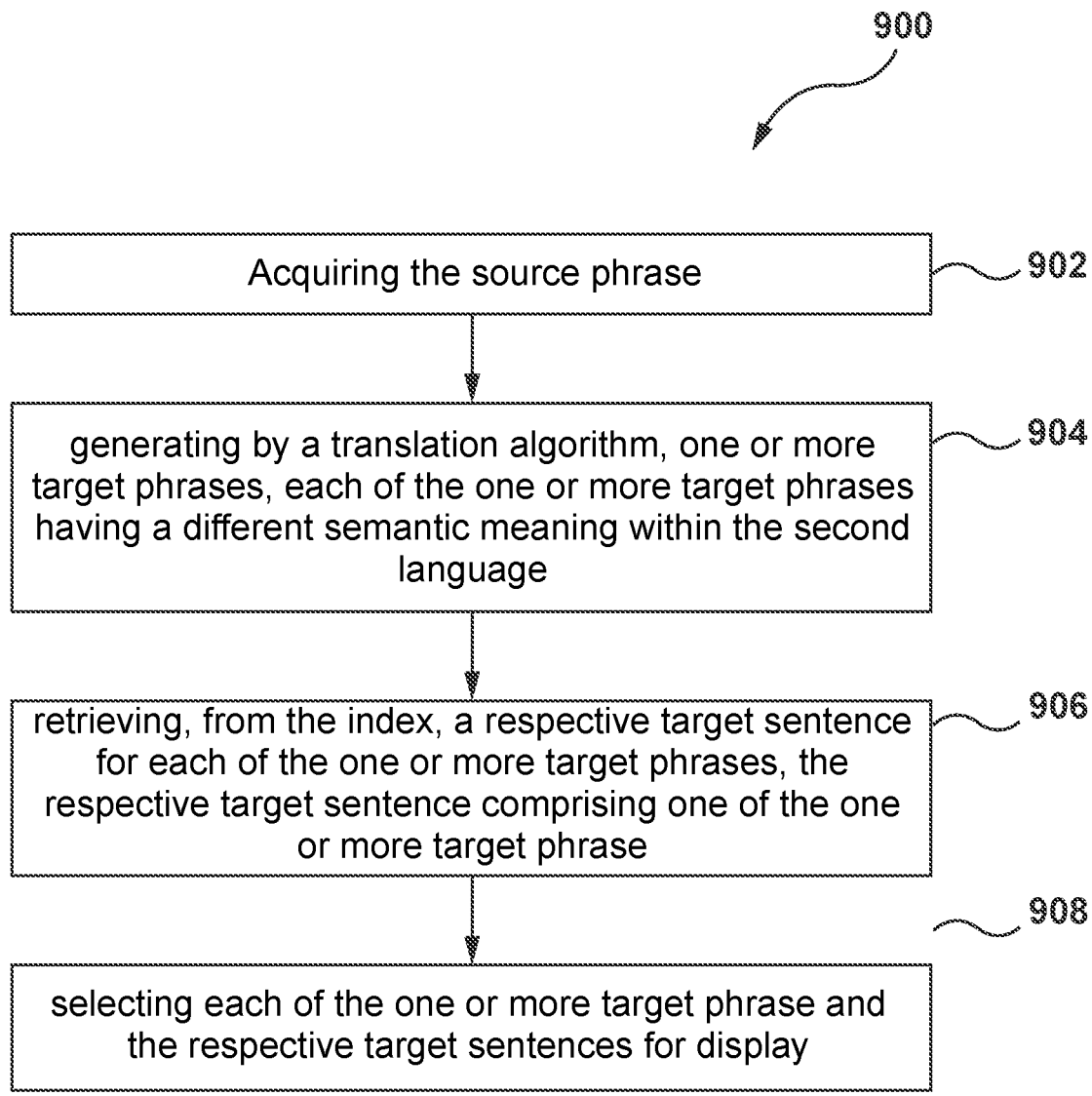
FIG. 9 depicts a block diagram of a flow chart of a method for translating a source phrase in a first language into a target phrase in a second language.

Given the architecture and examples provided herein above, it is possible to execute a computer-implemented method for translating a source phrase in a first language into a second language. With reference to FIG. 9, there is provided a flow chart of a method 900, the method 900 being executable in accordance with non-limiting embodiments of the present technology.

Step 902: acquiring the source phrase

The method 900 starts at step 902, where the translation routine 402 acquires, from the electronic device 102, the input phrase 202 via, for example, the data packet 408.

Step 904: generating by a translation algorithm, one or more target phrases, each of the one or more target phrases having a different semantic meaning within the second language At step 904, the translation routine 402 is configured to execute the translation algorithm 410 configured to translate the input phrase into a target language.

For example, the translation algorithm 410 has translated the input phrase 202 and generated the first translation 502 and the second translation 504, where both the first translation 502 and the second translation 504 are semantically different.

The translation routine 402 is then configured to data packet 412 to the retrieving routine 404. The data packet 412 comprises the first translation 502 and the second translation 504.

Step 906: retrieving, from the index, a respective target sentence for each of the one or more target phrases, the respective target sentence comprising one of the one or more target phrases At step 906, in response to receiving the data packet 412 by the translation routine 402, the retrieving routine 404 is configured to access the database 126.

More precisely, the retrieving routine 404 is configured to access the index 302 stored within the database 126 and retrieve one or more sentences for each translation included within the data packet 412.

For example, the retrieving routine 404 has retrieved two sentences from the plurality of sentences 308 that comprises the first translation 502, namely the first sentence 602 and the second sentence 604. On the other hand, the retrieving routine 404 has retrieved three sentences from the plurality of sentences 308 that comprises the second translation 504, namely the third sentence 606, the fourth sentence 608 and the fifth sentence 610.

In some non-limiting embodiments of the present technology, the retrieving routine 404 is configured to execute the MLA 414 configured to rank the retrieved sentences for each of the first translation 502 and the second translation 504, and select the n-number of highest ranked sentences for each of the translation.

The retrieving routine 404 is then configured to transmit the data packet 416 to the displaying routine 406. The data packet 416 comprises the n-highest ranked sentences for each of the first translation 502 and the second translation 504.

Step 908: selecting each of the one or more target phrase and the respective target sentences for display At step 908, the displaying routine 406 is configured to transmit the trigger 418 to the electronic device 102. The trigger 418 contains the first translation 502, the second translation 504, the highest ranked sentences for each of the first translation 502 and the second translation 504 and instructions to cause display of the GUI 702 or GUI 802.

The method 900 then terminates.

It should be apparent to those skilled in the art that at least some embodiments of the present technology aim to expand a range of technical solutions for addressing a particular technical problem encountered by the conventional translation technology, namely determining example sentences of one or more translated word.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

We claim:

1. A computer-implemented method for translating a source phrase in a first language into a second language, the method executable by a computer device, the computer device configured to access:
   an index, the index comprising (i) a set of source sentences in the first language, and a set of target sentences in the second language, each of the target sentence included within the set of target sentences being extracted from a respective source and corresponding to a translation of a given source sentence within the set of source sentences and (ii) an indication of the respective source for each of the target sentences included within the set of target sentences;
   the method comprising:
   acquiring the source phrase;
   generating by a translation algorithm, one or more target phrases, each of the one or more target phrases having a different semantic meaning within the second language;
   retrieving, from the index, a respective target sentence for each of the one or more target phrases, the respective target sentence comprising one of the one or more target phrases; and
   selecting each of the one or more target phrase and the respective target sentences for display together with an indication of the respective source of each of the one or more target sentences.

2. The method of claim 1, further comprising:
   retrieving, from the index, one or more source sentences in the first language, each of the one or more source sentences corresponding to the translation of each respective target sentences; and
   selecting, the one or more source sentences for display.

3. The method of claim 1, wherein the respective source being one of:
   a book;
   a web site; and
   a video.

4. The method of claim 1, wherein:
   the computer device is a server coupled to a client device via a communication network;
   the acquiring the source phrase comprises receiving the source phrase from the client device; and wherein
   the selecting the one or more target sentences and the one or more target phrases for display comprises:
   transmitting the one or more target sentences and the one or more target phrases to the client device for display.

5. The method of claim 1, wherein
   the one or more target phrases comprises a first target phrase;
   the set of target sentences comprises a first sentence and a second sentence that includes the first target phrase; and
   wherein the retrieving the one or more target sentences comprises retrieving one of the first sentence and the second sentence.

6. The method of claim 5, wherein the retrieving one of the first sentence and the second sentence comprises:
   ranking, the first sentence and the second sentence;
   retrieving a highest ranked one of the first sentence and the second sentence as one of the one or more target sentences.

7. The method of claim 6, wherein the ranking the first sentence and the second sentence comprises:

determining a first set of features associated with the first sentence, the first set of features being representative of a pertinence of the first sentence;

determining a second set of features associated with the second sentence, the second set of features being representative of the pertinence of the second sentence;

ranking the first sentence and the second sentence based on the first set of features and the second set of features.

8. The method of claim 7, wherein the first set of features include at least one of:

a source of the first sentence;

a number of words included within the first sentence; and a popularity parameter associated with the source.

9. A computer device for translating a source phrase in a first language into a second language, the computer device being configured to access:

an index, the index comprising (i) a set of source sentences in the first language, and a set of target sentences in the second language, each of the target sentence included within the set of target sentences being extracted from a respective source and corresponding to a translation of a given source sentence within the set of source sentences and (ii) an indication of the respective source for each of the target sentences included within the set of target sentences;

the computer device comprising a processor configured to:

acquire the source phrase;

generate by a translation algorithm, one or more target phrases, each of the one or more target phrases having a different semantic meaning within the second language;

retrieve, from the index, a respective target sentence for each of the one or more target phrases, the respective target sentence comprising one of the one or more target phrases; and select each of the one or more target phrase and the respective target sentences for display together with an indication of the respective source of each of the one or more target sentences.

10. The computer device of claim 9, the processor being further configured to:

retrieve, from the index, one or more source sentences in the first language, each of the one or more source sentences corresponding to the translation of each respective target sentences; and select, the one or more source sentences for display.

11. The computer device of claim 9, wherein the respective source being one of:

a book;

a web site; and a video.

12. The computer device of claim 9, wherein:

the computer device is a server coupled to a client device via a communication network;

to acquire the source phrase the processor is configured to receive the source phrase from the client device; and wherein to select the one or more target sentences and the one or more target phrases for display, the processor is configured to:

transmit the one or more target sentences and the one or more target phrases to the client device for display.

13. The computer device of claim 9, wherein the one or more target phrases comprises a first target phrase;

the set of target sentences comprises a first sentence and a second sentence that includes the first target phrase; and wherein to retrieve the one or more target sentences, the processor is configured to retrieve one of the first sentence and the second sentence.

14. The computer device of claim 13, wherein to retrieve the one of the first sentence and the second sentence, the processor is configured to:

rank, the first sentence and the second sentence; and retrieve a highest ranked one of the first sentence and the second sentence as one of the one or more target sentences.

15. The computer device of claim 14, wherein to rank the first sentence and the second sentence, the processor is configured to:

determine a first set of features associated with the first sentence, the first set of features being representative of a pertinence of the first sentence;

determine a second set of features associated with the second sentence, the second set of features being representative of the pertinence of the second sentence;

rank the first sentence and the second sentence based on the first set of features and the second set of features.

16. The computer device of claim 15, wherein the first set of features include at least one of:

a source of the first sentence;

a number of words included within the first sentence; and a popularity parameter associated with the source.

17. A computer-implemented method for translating a source phrase in a first language into a second language, the method executable by a computer device, the computer device configured to access:

an index, the index comprising (i) a set of source sentences in the first language, and a set of target sentences in the second language, each of the target sentence included within the set of target sentences being extracted from a respective source and corresponding to a translation of a given source sentence within the set of source sentences and (ii) an indication of the respective source for each of the target sentences included within the set of target sentences, the source being one of a book, a website and a video;

the method comprising:

acquiring the source phrase;

generating by a translation algorithm, one or more target phrases, each of the one or more target phrases having a different semantic meaning within the second language;

retrieving, from the index, a respective target sentence for each of the one or more target phrases, the respective target sentence comprising one of the one or more target phrases; and selecting each of the one or more target phrase and the respective target sentences for display together with an indication of the respective source of each of the one or more target sentences.

* * * * *